No. 870,602.
PATENTED NOV. 12, 1907.
D. WARNER & H. KITCHEL.
SPRING WHEEL.
APPLICATION FILED NOV. 12, 1906.
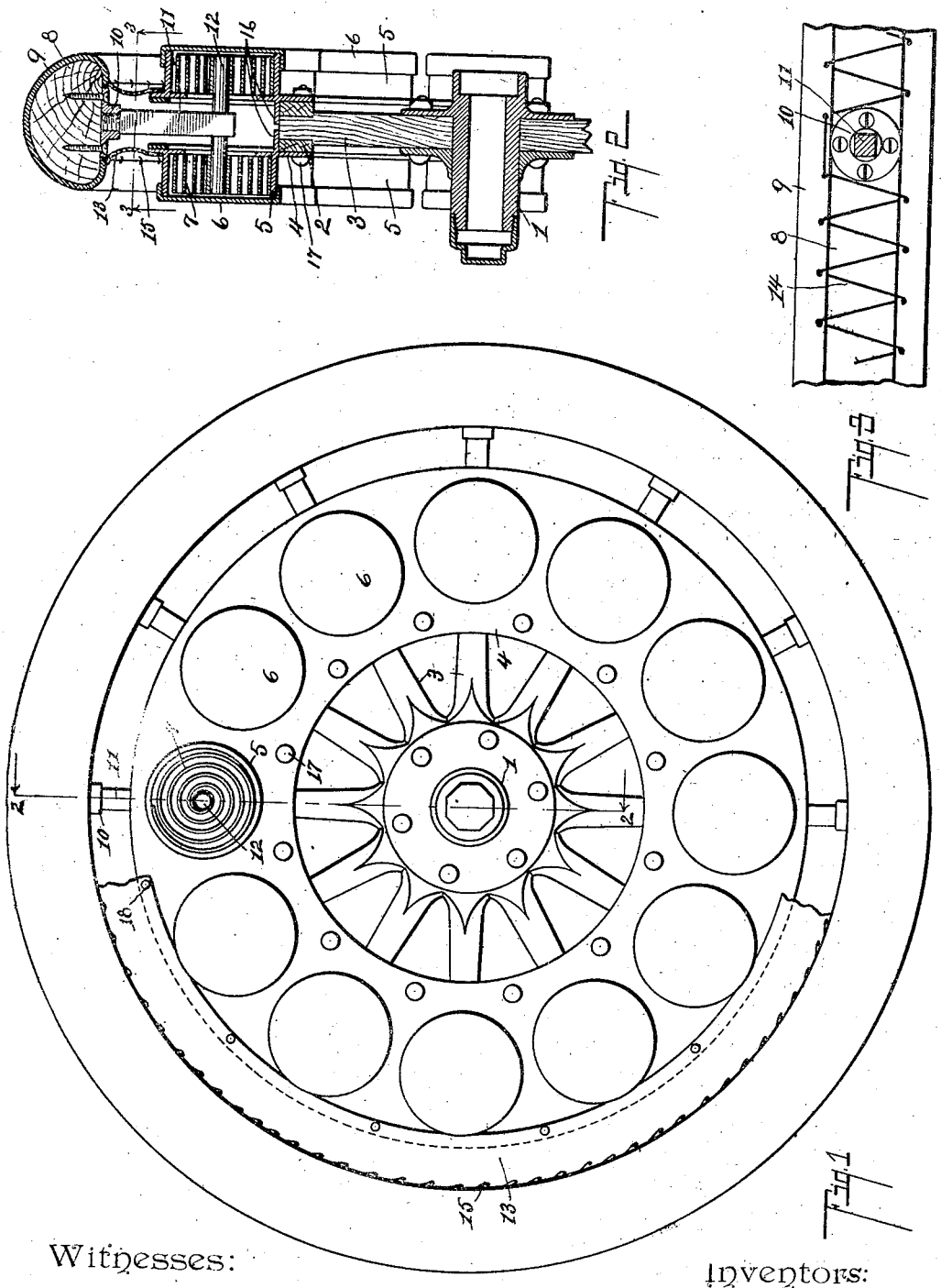

UNITED STATES PATENT OFFICE.

DANIEL WARNER, OF BRONSON, AND HORACE KITCHEL, OF COLDWATER, MICHIGAN, ASSIGNORS TO THE AMERICAN AUTO WHEEL COMPANY, OF COLDWATER, MICHIGAN, A CORPORATION.

SPRING-WHEEL.

No. 870,602.   Specification of Letters Patent.   Patented Nov. 12, 1907.

Application filed November 12, 1906. Serial No. 343,172.

*To all whom it may concern:*

Be it known that we, DANIEL WARNER and HORACE KITCHEL, citizens of the United States, residing, respectively, at Bronson, county of Branch, State of Michigan, and Coldwater, Branch county, Michigan, have invented certain new and useful Improvements in Spring-Wheels, of which the following is a specification.

This invention relates to improvements in spring wheels.

The objects of this invention are,—First, to provide an improved spring wheel in which the elasticity of the spring members remains constant, *i. e.*, one in which it is not varied by the relative position of the springs in the wheel. Second, to provide an improved spring wheel in which the spring members are so formed and arranged that each spring carries its share of the load no matter what its relative position in the wheel may be. Third, to provide an improved spring wheel adapted for use as a driving wheel for motor vehicles which is very resilient and at the same time strong and durable. Fourth, to provide an improved spring wheel in which the spring members are held in proper relation with the co-acting parts without the necessity of securing them thereto by means of rivets, bolts, or the like. Fifth, to provide an improved spring wheel in which the parts are comparatively simple in structure and very easily and quickly assembled. Sixth, to provide an improved spring wheel in which any spring member can be quickly removed and replaced, should occasion require, without disturbing any of the other parts of the wheel.

Further objects, and objects relating to structural details, will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this application, in which, Figure 1 is a side elevation of a structure embodying the features of our invention, portions being broken away to show the relation of the parts. Fig. 2 is a detail section taken on a line corresponding to line 2—2 of Fig. 1. Fig. 3 is a detail section taken on a line corresponding to line 3—3 of Fig. 2.

In the drawing, the sectional views are taken looking in the direction of the little arrows at the ends of the section lines and similar reference characters refer to similar parts throughout the several views.

Referring to the drawing, the hub 1 of the structure herein illustrated is formed of metal and is provided with suitable spoke flanges which are clamped upon the inner spoke sections 3. On the outer ends of these inner spoke sections is a rim 2, as clearly appears from Fig. 2 of the drawing. The main side plates 4 are secured upon this rim 2 preferably by bolts 17 arranged therethrough, the side plates being provided with inwardly projecting annular flanges adapted to receive the rim. On the side plates are spring pockets 5 having caps, preferably screw-threaded, thereon. The side plates are so arranged upon the rim that their spring pockets are opposite or arranged in pairs. The pockets are open on the inside, as clearly appears from the drawing. Within the pockets are arranged the spiral springs 7 which are preferably of such size that their outer coils fit within the walls of the pockets, the pockets being preferably round, as shown in the drawing.

The felly or rim is preferably provided with threaded spoke sockets 10 into which the outer spoke sections 11 are threaded. These outer spoke sections are preferably T-shaped, the arms 12 thereof being loosely arranged in the central coils of the springs 7. By this arrangement, the felly or rim 8 is yieldingly supported by the springs 7. It is evident that, owing to the shape and arrangement of the springs and the connections thereto, it is immaterial what relative position they occupy in the wheel, the tension thereof is not varied and neither is the strain thereon, each spring carrying its share of the load. With the springs arranged in pairs and the outer springs connected thereto, the rim or felly is supported so that, although it has a lateral movement, its central position is effectively maintained.

By arranging and supporting the springs as we have illustrated and described, it is not necessary to secure them by means of rivets or otherwise. This is of advantage not only for convenience in the manufacture and assembling, but also the springs are not weakened by forming holes therethrough.

Our improved spring wheel is particularly desirable for use as a wheel for motor vehicles, as it obviates the necessity of pneumatic tires. The wheel, while capable of carrying very heavy loads, is very resilient and it is well adapted to absorb jars and shocks of all kinds and carry the vehicle with a minimum of vibration.

We have illustrated in the accompanying drawing the rim 8 as formed of wood and covered with a tire 9 of rubber secured by lacings 14 on the inside. It is evident, however, that any form of rim might be used in this relation.

At each side of the outer spoke sections, we preferably provide flexible guards 13 which are secured to the side plates and to the felly by buttons 18 and lacings 15, as clearly appears from the drawing. This means for securing the guard is particularly advantageous on account of the facility with which it may be removed. It is evident, however, that any suitable means might be employed.

When our improved spring wheel is used as a driving wheel for motor vehicles, the tendency is for the hub to move somewhat forwardly off the center. This, however, is no disadvantage, but rather an advantage. By arranging the springs in pockets as we have illustrated, it is evident that any one may be removed and replaced without disturbing the others.

Instead of the spiral springs shown in the drawings, other forms of spring devices may be used, such as an air cushion.

We have illustrated and described our improved wheel in detail in the form preferred by us on account of its structural simplicity and convenience in assembling of the parts, also the facility with which they may be disassembled, should occasion require. We are, however, aware that it is capable of very great variation in structural details without departing from our invention and we desire to be understood as claiming the same broadly, as illustrated, as well as specifically.

Having thus described our invention, what we claim as new and desire to secure by Letters Patent is:

1. In a spring wheel, the combination with a hub, of the inner spoke sections secured therein; a rim on the outer ends of said inner spoke sections; side plates secured to said rim, said side plates being provided with inwardly projecting annular flanges adapted to receive said rim; spring pockets on said side plates; screw caps for said pockets; spiral springs arranged in said pockets and retained therein by said pocket caps, the outer coils of the springs being adapted to fit the walls of the pockets; a felly; T-shaped outer spoke sections, secured to said felly, the arms of said spokes being arranged in the inner coils of said springs; and guards of flexible material secured to said side plates and rim.

2. In a spring wheel, the combination with a hub, of the inner spoke sections secured therein; a rim on the outer ends of said inner spoke sections; side plates secured to said rim; spring pockets on said side plates; screw caps for said pockets; spiral springs arranged in said pockets and retained therein by said pocket caps, the outer coils of the springs being adapted to fit the walls of the pockets; a felly; T-shaped outer spoke sections, secured to said felly, the arms of said spokes being arranged in the inner coils of said spring; and guards of flexible material secured to said side plates and rim.

3. In a spring wheel, the combination with a hub, of the inner spoke sections secured therein; a rim on the outer ends of said inner spoke sections; side plates secured to said rim, said side plates being provided with inwardly projecting annular flanges adapted to receive said rim; spring pockets on said side plates; screw caps for said pockets; spiral springs arranged in said pockets and retained therein by said pocket caps, the outer coils of the springs being adapted to fit the walls of the pockets; a felly; T-shaped outer spoke sections, secured to said felly, the arms of said spokes being arranged in the inner coils of said springs.

4. In a spring wheel, the combination with a hub, of the inner spoke sections secured therein; a rim on the outer ends of said inner spoke sections; side plates secured to said rim; spring pockets on said side plates; screw caps for said pockets; spiral springs arranged in said pockets and retained therein by said pocket caps, the outer coils of the springs being adapted to fit the walls of the pockets; a felly; and T-shaped outer spoke sections, secured to said felly, the arms of said spokes being arranged in the inner coils of said spring.

5. In a spring wheel, the combination with a hub, of the inner spoke sections secured therein; a rim on the outer ends of said inner spoke sections; side plates secured to said rim, said side plates being provided with inwardly projecting annular flanges adapted to receive said rim; spring pockets on said side plates; spiral springs arranged in said pockets; a felly; T-shaped outer spoke sections, secured to said felly, the arms of said spokes being arranged in the inner coils of said springs; and guards of flexible material secured to said side plates and rim.

6. In a spring wheel, the combination with a hub, of the inner spoke sections secured therein; a rim on the outer ends of said inner spoke sections; side plates secured to said rim; spring pockets on said side plates; spiral springs arranged in said pockets; a felly; and T-shaped outer spoke sections, secured to said felly, the arms of said spokes being arranged in the inner coils of said springs and rim.

7. In a spring wheel, the combination with a hub, of the inner spoke sections secured therein; a rim on the outer ends of said inner spoke sections; side plates secured to said rim, said side plates being provided with inwardly projecting annular flanges adapted to receive said rim; spring pockets on said side plates; spiral springs arranged in said pockets; a felly; and T-shaped outer spoke sections secured to said felly, the arms of said spokes being arranged in the inner coils of said spring.

8. In a spring wheel, the combination with a hub, of the inner spoke sections secured therein; a rim on the outer ends of said inner spoke sections; side plates secured to said rim; spring pockets on said side plates; spiral springs arranged in said pockets; a felly; and T-shaped outer spoke sections, secured to said felly, the arms of said spokes being arranged in the inner coils of said springs.

9. In a spring wheel, the combination with a hub, of the inner spoke sections secured therein; a rim on the outer ends of said inner spoke sections; side plates secured to said rim; spring pockets on said side plates; spiral springs arranged in said pockets; a felly; outer spoke sections, secured to said felly arranged to engage the inner coils of said springs; and guards of flexible material secured to said side plates and rim.

10. In a spring wheel, the combination with a hub, of the inner spoke sections secured therein; a rim on the outer ends of said inner spoke sections; side plates secured to said rim; spring pockets on said side plates; spiral springs arranged in said pockets; a felly; outer spoke sections, secured to said felly arranged to engage the inner coils of said springs.

11. In a spring wheel, the combination with a hub, of the inner spoke sections secured therein; spring pockets arranged in pairs carried by said inner spoke sections; screw caps for said pockets; spiral springs loosely arranged in said pockets and retained therein by said pocket caps; a felly; and T-shaped outer spoke sections, secured to said felly, the arms of said spokes being loosely arranged in the inner coils of said springs.

12. In a spring wheel, the combination with a hub, of the inner spoke sections secured therein; spring pockets arranged in pairs carried by said inner spoke sections; spiral springs loosely arranged in said pockets; a felly; and T-shaped outer spoke sections secured to said felly, the arms of said spokes being loosely arranged in the inner coils of said spring.

13. In a spring wheel, the combination with a hub, of the inner spoke sections secured therein; spring pockets arranged in pairs carried by said inner spoke sections; screw caps for said pockets; spiral springs arranged in said pockets and retained therein by said pocket caps; a felly; and T-shaped outer spoke sections secured to said felly, the arms of said spokes being arranged in the inner coils of said springs.

14. In a spring wheel, the combination with a hub, of the inner spoke sections secured therein; spring pockets arranged in pairs carried by said inner spoke sections; spiral springs arranged in said pockets; a felly; and T-shaped outer spoke sections secured to said felly, the arms of said spokes being arranged in the inner coils of said springs.

15. In a spring wheel, the combination with a hub, of the inner spoke sections secured therein; spring pockets carried by said inner spoke sections; screw caps for said pockets; spiral springs loosely arranged in said pockets and retained therein by said pocket caps; a felly; and outer spoke sections secured to said felly arranged to engage the inner coils of said springs.

16. In a spring wheel, the combination with a hub, of the inner spoke sections secured therein; spring pockets carried by said inner spoke sections; spiral springs arranged in said pockets; a felly; and outer spoke sections secured to said felly arranged to engage the inner coils of said springs.

17. In a spring wheel, the combination with a hub, of the inner spoke sections secured thereto; spring pockets carried by said inner spoke sections; springs loosely arranged in said pockets; a felly or rim; and spoke sections secured thereto arranged to loosely engage the inner coils of said springs.

18. In a spring wheel, the combination with the hub, of the inner spoke sections secured thereto; spring pockets carried by said inner spoke sections; springs arranged in said pockets; a felly or rim; and spoke sections secured thereto arranged to engage the inner coils of said springs.

19. In a spring wheel, the combination with a hub, of the inner spoke sections secured thereto; spiral springs arranged in pairs carried by said inner spoke sections; a felly or rim; and T-shaped spoke sections secured thereto arranged between said pairs of springs with their arms arranged to engage the inner coils thereof.

20. In a spring wheel, the combination with a hub, of the inner spoke sections secured thereto; a felly or rim; outer spoke sections secured thereto; and spiral springs for connecting said spoke sections arranged in pairs one at each side of the spoke sections, for the purpose specified.

21. In a spring wheel, the combination with a hub, of the inner spoke sections secured thereto; a felly or rim; outer spoke sections secured thereto; and springs for connecting said spoke sections arranged in pairs at each side of the spoke sections, for the purpose specified.

22. In a spring wheel, the combination with a hub of the inner spoke sections secured thereto; a felly or rim; outer spoke sections secured thereto; and spring devices for connecting said spoke sections arranged in pairs at each side of the spoke sections, for the purpose specified.

In witness whereof, we have hereunto set our hands and seals in the presence of two witnesses.

DANIEL WARNER. [L. S.]
       HORACE KITCHEL. [L. S.]

Witnesses:
 MARGARET MONROE,
 CHAS. U. CHAMPION.